3,266,982
PROCESS FOR CONTROLLING PESTS
Ivan C. Popoff, Ambler, Pa., assignor to Pennsalt Chemicals Corporation, Philadelphia, Pa., a corporation of Pennsylvania
No Drawing. Filed Mar. 19, 1965, Ser. No. 441,366
26 Claims. (Cl. 167—30)

This invention deals with formulations and methods of using them in order to control numerous pests e.g. fungi, mites, nematodes etc. In particular, the invention deals with the use, as pesticides, of compounds having the general structure:

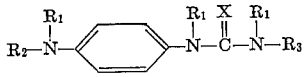

where $R_1$ is a member of the group consisting of alkyl, alkenyl, cycloalkenyl, cycloalkyl, and aryl radicals, $R_2$ is a member of the group of hydrogen, $R_1$ and

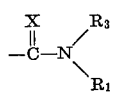

radicals, $R_3$ being selected from the group of $R_1$ and

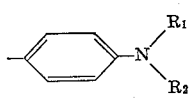

radicals, and X is an atom selected from the group of oxygen and sulfur. $R_1$ will generally contain from one to twelve carbon atoms and will preferably be alkyl.

Compounds of the above described structure are disclosed and methods for their preparation given in U.S. 3,138,571, which issued June 23, 1964, in the name of Ivan C. Popoff.

The compounds described above used as pesticides against pests affecting plants will be applied and formulated in the usual manner. The compounds are particularly effective as fungicides for use on agricultural crops. The compounds may be used at effective concentrations which will generally range from about 1 pound to 100 pounds per acre. Preferably the concentrations used will be in the range of 3 to 30 pounds per acre and such concentrations may be used without damaging or destroying the crop. Compositions may be formulated as dispersions in water with or without suitable wetting agents which will aid in penetration of plant and soil surfaces. The compounds may be made more compatible with water by addition of water soluble solvents such as ethylene glycol, diacetone alcohol, acetone, methanol, ethanol, and other solvents for the compounds. Suitable water dispersion concentrates may be prepared by ball milling the solid material in water with a suitable wetting and suspending agent such as lignin sulfonate, bentonite, etc. Alternatively, solutions of the agents in organic solvents may be employed for use under field conditions.

Compositions may also be prepared as emulsion concentrates for dilution with water for field application. These concentrates may be prepared by the use of suitable solvents such as xylene, isophorone, heavy aromatic naphtha, methylated naphthalene, and the like, with the addition of suitable emulsifying agents which are usually blends of various compounds having the proper ratios of oil and water solubility properties and which are stable in the presence of the compound.

Wettable powders may be prepared by direct grinding of the dry compounds with a blend of a suitable dispersing agent such as attapulgite, bentonite, kieselguhr, etc. It is desirable to grind such a blend in a hammer mill so that 99% will pass through a 325-mesh screen. Wettable powders may also be prepared by absorbing a solution of the compound in a solvent such as xylene or acetone on a powdered or granular clay such as attapulgite or diatomaceous earth. All wettable powder preparations should contain a dispersing agent such as a lignin sulfonate and a wetting agent such as an alkylaryl polyether glycol.

The compounds of the invention may also be used to formulate granules of 5 to 20% concentration of active ingredient. The user may make application by use of a granular applicator rather than a duster or sprayer and known methods in commercial use are applicable for the preparation of granular formulations.

In general, the formulated compositions will contain from about 1% to about 90% by weight of active agent. Examples of suitable formulations are as follows:

I. Aqueous dispersion:        Parts by weight
 (A)
N,N'-bis[3 - (5-methyl)heptyl] - N - (N'',N''-diethylthiocarbamyl)-p-phenylenediamine __ 50
Sodium lignosulfonate dispersant _____ 5
Water _____ 45

(B)
Reaction product of N,N'-bis[3-(5-methyl)heptyl]-p-phenylenediamine with thiophosgene in 1:1 mole ratio _____ 20
Sodium lignosulfonate _____ 5
Water _____ 75

II. Emulsion concentrate:
N,N' - di - sec - butyl - N,N' - bis(N'',N'' - diethylcarbamyl)-p-phenylenediamine _____ 10.0
Xylene _____ 89.0
Polyether alcohol surfactant ("Triton" X161) __ 1.0

The following evaluation techniques were employed in testing the pesticides.

*For nematocides—Contact.*—A water suspension of nematodes (*Panagrellus redivividus*) was mixed with an acetone, diacetone alcohol, or an isophorone emulsion concentrate of the compound for 48 hours and the percentage kill was determined. *Fumigant.*—The formulation of the chemical was injected 2 inches deep in one quart jar of soil and a vial of nemotodes suspension mixed with sand was placed on the soil surface. The jar was sealed and the percentage kill was determined after 48 hours.

*For miticides.*—Two-spotted mite infested leaves of the strong beans at paired leaf stage in pots were sprayed at the indicated rate per acre with an acetone, diacetone alcohol, or diethyl ketone emulsion concentrate and visual readings indicate the percentage kill.

*For fungicides—On bean plants.*—Snap or green beans were sprayed with a formulation of the compound and inoculated with *powdery mildew* cultures maintained on other plants. Readings were made on the amount of infection on the leaves as percentage of the check. The formulation of the compound was an aqueous dispersion of an acetone, diacetone alcohol or xylene solution of the product. *On tomato plants.*—Three or four week old tomato seedlings were sprayed with a formulation of the compound. The formulation was prepared as described above. After drying, the plants were inoculated with a suspension of sporangia from lima bean agar cultures of *Phytophthora infestants* and incubated for 18 hours at 10–20° C. in 100% humidity. Counts were made of spots of late blight infection when they appeared and control was recorded as percentage of check.

Table I lists the compounds which were evaluated in the above tests:

TABLE I

| Compound | Compound Name | Compound Structure |
|---|---|---|
| 1 | N,N'-bis[3-(5-methyl)heptyl]-N,N'-bis-{p-[3-(5-methyl)heptyl]aminophenyl-}thiourea. | |
| 2 | N,N'-di-sec-butyl-N-(N'',N''-diethylthiocarbamyl)-p-phenylenediamine. | |
| 3 | N,N'-di-sec-butyl-N-(N'',N''-diethylcarbamyl)-p-phenylenediamine. | |
| 4 | Reaction product of N,N'-bis[3-(5-methyl)heptyl]-p-phenylenediamine and phosgene in 1:1 mole ratio. | |
| 5 | Reaction product of N,N'-bis[3-(5methyl)heptyl)]-p-phenylenediamine and thiophosgene in 1:1 mole ratio. | |
| 6 | N,N'-di-sec-butyl-N,N'-bis(N'',N''-diethylthiocarbamyl)-p-phenylenediamine. | |
| 7 | N,N'-bis[3-(5-methyl)heptyl]-N,N'-bis{p-[3-(5-methyl)heptyl]aminophenyl}urea. | |
| 8 | N,N'-bis[3-(5-methyl)heptyl]-N,N'-bis(N'',N''-diethylthiocarbamyl)-p-phenylenediamine. | |
| 9 | N,N'-bis[3-(methyl)hepthy]-N-(N'',N''-diethylthiocarbamyl)-p-phenylenediamine. | |
| 10 | N,N'bis[3-(5-methyl)heptyl]-N,N'-bis(N'',N''-diethylcarbamyl)-p-phenylenediamine. | |
| 11 | N,N'-bis[3-(5-methyl)heptyl]-N-(N'',N''-diethylcarbamyl)-p-phenylenediamine. | |
| 12 | Reaction product of N,N'-di-sec-butyl-p-phenylenediamine and thiophosgene in 1:1 mole ratio. | |
| 13 | N,N'-di-sec-butyl-N,N'-bis(p-sec-butylaminophenyl)-thiourea. | |
| 14 | N,N'-di-sec-butyl-N,N'-bis(N'',N''-diethylcarbamyl)-p-phenylenediamine. | |
| 15 | N,N'-di-sec-butyl-N,N'-bis(p-sec-butylaminophenyl)urea | |
| 16 | Reaction product of N,N'-di-sec-butyl-p-phenylenediamine with phosgene in 1:1 ratio. | |

The tables which follow illustrate the pesticidal effects of the compounds listed in Table I:

TABLE II

*Nematocidal effects of compounds listed in Table I*

| Compound No. | Contact | | Fumigant | |
|---|---|---|---|---|
| | Concentration (parts per million) | Percent kill | Concentration grams/qt. jar | Percent kill |
| 1 | 25 | 100 | 0.125 | 95 |
| 2 | 12.5 | 45 | | |
| 3 | 25 | 90 | 0.5 | 50 |
| 5 | | | 0.125 | 100 |
| 8 | 25 | 25 | 0.5 | 75 |
| 10 | 25 | 25 | | |
| 11 | | | 0.25 | 25 |
| 13 | 25 | 50 | 0.25 | 10 |
| 16 | 25 | 90 | 0.25 | 100 |

TABLE III

*Miticidal effects of compounds listed in Table I against two-spotted mite at 5 pounds per acre*

| Compound No.: | Percent miticide control |
|---|---|
| 6 | 60 |
| 11 | 47 |
| 16 | 75 |

When compound No. 16 was evaluated at 2.5 pounds per acre it also showed 75% control of mites. In addition compound No. 16 showed 100% control as a protectant when sprayed on non-infected leaves of string bean plants.

TABLE IV

*Fungicidal effects of compounds listed in Table I at 5 lbs./acre*

| Compound No. | On bean plants | On tomato plants |
|---|---|---|
| 1 | 95 | |
| 3 | 88 | 55 |
| 4 | 97 | 75 |
| 5 | 53 | 82 |
| 6 | 66 | |
| 7 | 10 | 79 |
| 8 | 62 | |
| 9 | 53 | 10 |
| 10 | 93 | |
| 11 | 39 | |
| 13 | 74 | |
| 14 | 58 | 100 |
| 14 [1] | | 100 |
| 15 | 53 | 86 |
| 16 | 14 | 74 |

[1] At 0.65 lb./acre.

Additional compounds which have the general structure

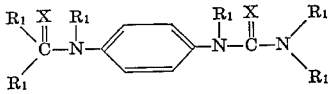

and which show pesticidal effects are:

N,N' - di - dodecyl - N,N' - bis(N" - di - cyclohexylcarbamyl)-p-phenylenediamine, N,N' - di - cyclohexyl - N,N' - bis(N",N" - di - n - octylthiocarbamyl)-p-phenylenediamine, N,N' - di - sec - butyl - N,N' - bis(N" - methyl - N" - ethylcarbamyl)-p-phenylenediamine, N,N' - diphenyl - N,N' - bis(N",N" - diethylcarbamyl)-p-phenylenediamine, N,N' - di - p - tolyl - N,N' - bis(N",N" - dimethylthiocarbamyl)-p-phenylenediamine, N - methyl - N' - phenyl - N,N' - bis(N",N" - dimethylcarbamyl)-p-phenylenediamine, N,N' - diallyl - N,N' - bis(N",N" - diethylthiocarbamyl)-p-phenylenediamine, Additional compounds which have the general structure

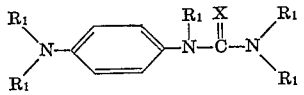

and which affect pests such as nematodes, fungi, and mites are:

N,N' - di - sec - butyl - N - (N",N" - diallylthiocarbamyl)-p-phenylenediamine, and N,N'-di(methallyl)-N-(N",N"-diethylthiocarbamyl)-p-phenylenediamine, N,N'-bis-[3-(5-methyl)heptyl]-N-(N",N"-di-tert-butylthiocarbamyl)-p-phenylenediamine, N,N'-diphenyl-N-(N",N"-dimethylcarbamyl)-p-phenylenediamine, N,N'-diethyl-N-(N",N"-dimethylcarbamyl)-p-phenylenediamine, N,N,N'-tri-sec-butyl-N'-(N",N"-di-n-propylcarbamyl-p-phenylenediamine, N,N'-didodecyl-N-sec-butyl-N'-(N",N"-diethylthiocarbamyl)-p-phenylenediamine, N,N,N'-tris-[3-(5-methylheptyl)]-N'-(N",N"-dicyclohexylthiocarbamyl)-p-phenylenediamine, and N-methyl-N,N'-diphenyl-N'-(N",N"-diethylcarbamyl)-p-phenylenediamine.

It will be understood that numerous changes and variations may be made from the above examples and disclosure without departing from the spirit and scope of the invention.

I claim:

1. A method of obtaining pesticidal effects which comprises contacting pests affecting plants with an effective amount of a compound having the structure

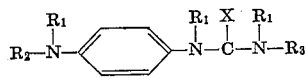

where $R_1$ is a member of the group consisting of alkyl, alkenyl, cycloalkenyl, cycloalkyl, and aryl containing up to twelve carbon atoms, $R_2$ is a member of the group consisting of hydrogen, $R_1$ and

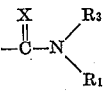

$R_3$ being selected from the group consisting of $R_1$ and

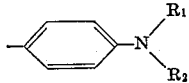

and X is an atom selected from the group consisting of oxygen and sulfur.

2. A method for controlling pests affecting plants which comprises contacting said plants with a pesticidal amount of a compound having the structure

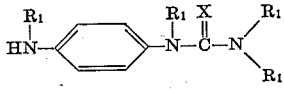

where $R_1$ is selected from the group consisting of alkyl, alkenyl, cycloalkenyl, cycloalkyl, and aryl containing up to twelve carbon atoms and X is selected from the group consisting of oxygen and sulfur.

3. The method of claim 2 wherein the active agent is

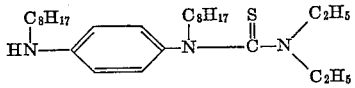

4. The method of claim 2 wherein the active agent is

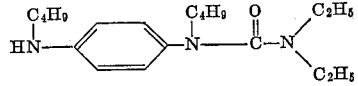

5. The method of claim 2 wherein the active agent is

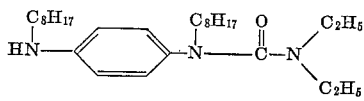

6. The method of claim 2 wherein the active agent is

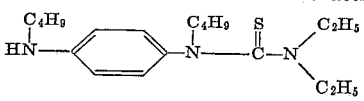

7. A method for controlling pests affecting plants which comprises contacting said pests with an effective amount of a compound of structure

where $R_1$ is selected from the group consisting of alkyl, alkenyl, cycloalkenyl, cycloalkyl, and aryl radicals containing up to twelve carbon atoms and X is selected from the group consisting of oxygen and sulfur.

8. The method of claim 7 wherein the active agent is

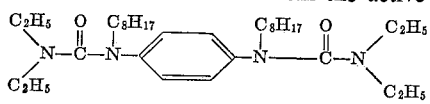

9. The method of claim 7 wherein the active compound is

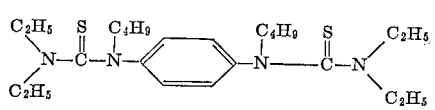

10. The method of claim 7 wherein the active compound is

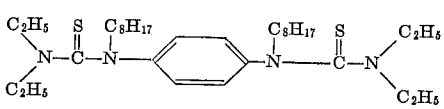

11. The method of claim 7 wherein the active compound is

12. A method for controlling pests affecting plants which comprises contacting said pests with an effective amount of a compound of structure

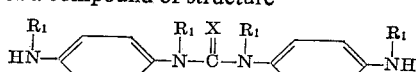

where $R_1$ is selected from the group consisting of alkyl, alkenyl, cycloalkenyl, cycloalkyl and aryl radicals containing up to twelve carbon atoms and X is selected from the group consisting of oxygen and sulfur.

13. The method of claim 12 wherein the compound is

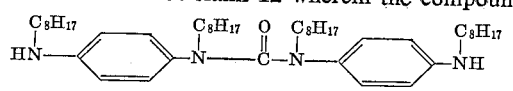

14. The method of claim 12 wherein the compound is

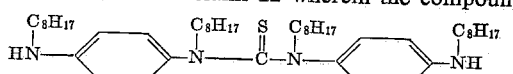

15. The method of claim 12 wherein the compound is

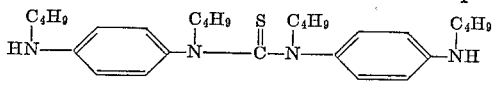

16. The method of claim 12 where the compound is

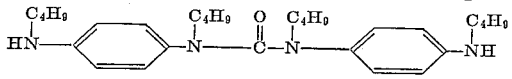

17. A method for controlling pests affecting plants which comprises contacting plants with an effective amount of the reaction product of

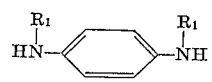

and phosgene or thiophosgene in a 1:1 mole ratio where $R_1$ is selected from the group consisting of alkyl, alkenyl, cycloalkyl and aryl containing up to twelve carbon atoms.

18. The method of claim 17 wherein the active agent is the reaction product of N,N'-bis[3-(5-methyl)heptyl]-p-phenylenediamine and phosgene in a 1:1 ratio.

19. The method of claim 17 wherein the active agent is the reaction product of N,N'-di-sec-butyl-p-phenylenediamine and phosgene in a 1:1 mole ratio.

20. The method of claim 17 wherein the active agent is the reaction product of N,N'-bis[3-(5-methyl)heptyl]-p-phenylenediamine and thiophosgene in a 1:1 mole ratio.

21. The method of claim 17 wherein the active agent is the reaction product of N,N'-di-sec-butyl-p-phenylenediamine and thiophosgene in a 1:1 mole ratio.

22. The method of controlling fungi on plants which comprises contacting said plants with a fungicidal amount of the reaction product of N,N'-bis[3-(5-methyl)heptyl]-p-phenylenediamine and phosgene in a 1:1 mole ratio.

23. The method of controlling fungi on plants which comprises contacting said plants with a fungicidal amount of a compound of structure

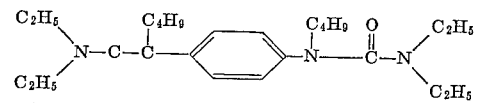

24. The method of controlling nematodes which comprises contacting said nematodes with a nematocidal amount of a compound of structure

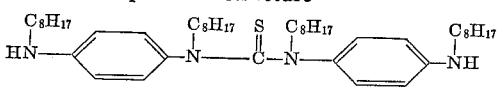

25. The method of controlling nematodes which comprises contacting said nematodes with a nematocidal amount of the reaction product of N,N'-bis[3-(5-methyl)-heptyl]-p-phenylenediamine and thiophosgene in a 1:1 mole ratio.

26. The method of controlling nematodes which comprises contacting said nematodes with a nematocidal amount of the reaction of product of N,N'-di-sec-butyl-p-phenylenediamine and phosgene in a 1:1 mole ratio.

References Cited by the Examiner

UNITED STATES PATENTS 3,138,571   6/1964   Popoff _____ 260—552

JULIAN S. LEVITT, *Primary Examiner.*

STANLEY J. FRIEDMAN, *Examiner.*